United States Patent
Tassie

[11] 3,893,479
[45] July 8, 1975

[54] HIGH RATE OF FLOW PORT FOR SPOOL VALVES

[75] Inventor: Douglas P. Tassie, St. George, Vt.

[73] Assignee: General Electric Company, Burlington, Vt.

[22] Filed: July 11, 1973

[21] Appl. No.: 378,146

Related U.S. Application Data

[62] Division of Ser. No. 148,833, June 1, 1971.

[52] U.S. Cl............................ 137/625.3; 137/625.37
[51] Int. Cl............................ F16k 3/24; F16k 3/34
[58] Field of Search........ 137/625.3, 625.33, 625.37, 137/625.38; 251/205

[56] References Cited
UNITED STATES PATENTS

| | | | |
|---|---|---|---|
| 1,111,244 | 9/1914 | Wilson | 137/625.37 X |
| 2,556,308 | 6/1951 | Weatherhead, Jr. | 251/DIG. 1 |
| 2,810,259 | 10/1957 | Burdett, Jr. | 137/625.37 X |
| 2,918,087 | 12/1959 | Curran | 137/625.3 |
| 3,752,188 | 8/1973 | Sage | 137/625.3 X |

FOREIGN PATENTS OR APPLICATIONS

| | | | |
|---|---|---|---|
| 73,216 | 3/1948 | Norway | 137/625.3 |

Primary Examiner—Arnold Rosenthal
Attorney, Agent, or Firm—Bailin L. Kuch

[57] ABSTRACT

A feature of this invention is a spool valve which has a spool with an O-ring seal, said seal having a given longitudinal dimension, the spool operating in a bore in a housing to open and close a port opening into said bore, said port formed of a plurality of apertures, each aperture having a diameter, parallel to the longitudinal axis of said O-ring, which is smaller than said given longitudinal dimension of said seal.

4 Claims, 5 Drawing Figures

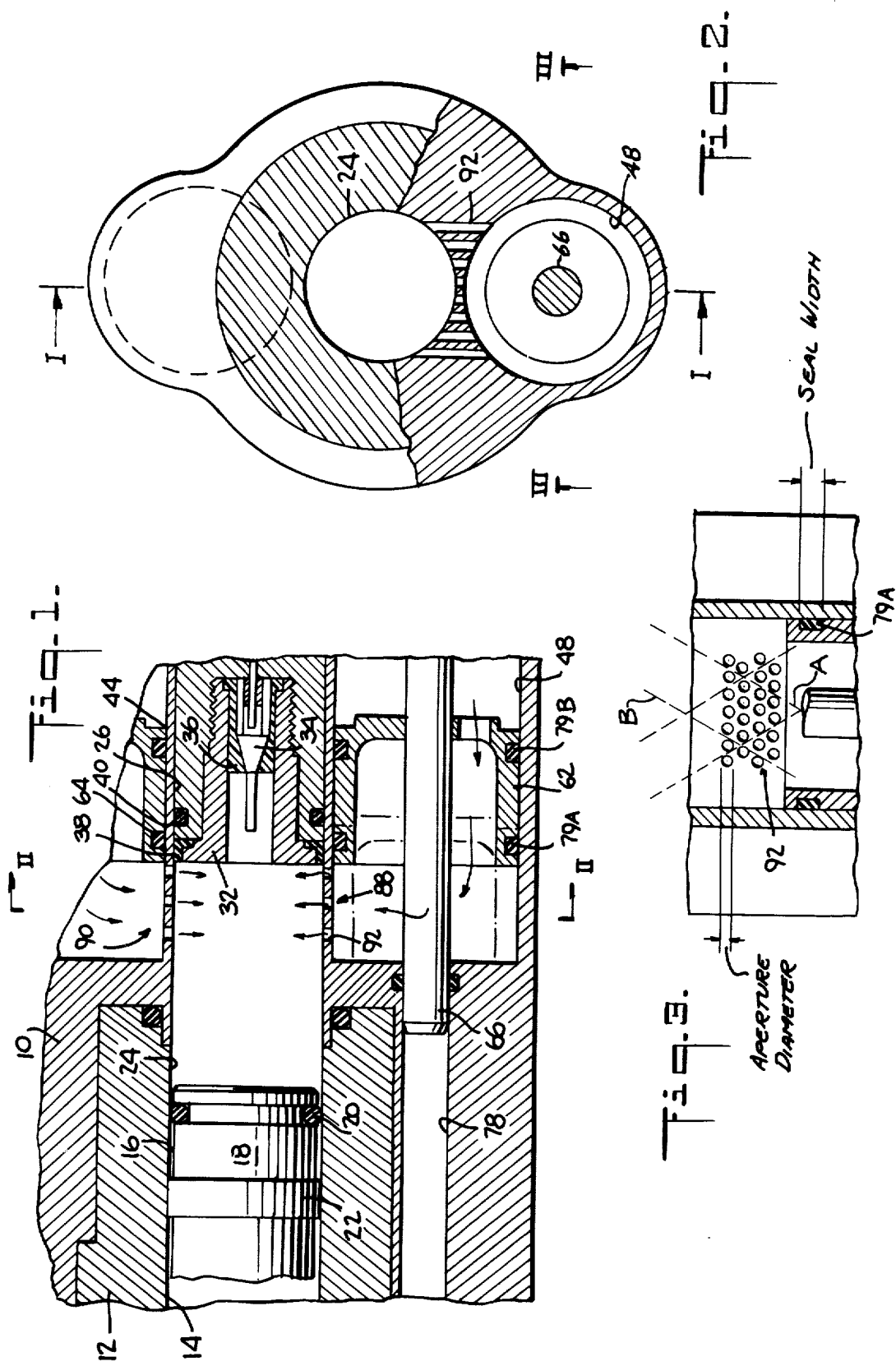

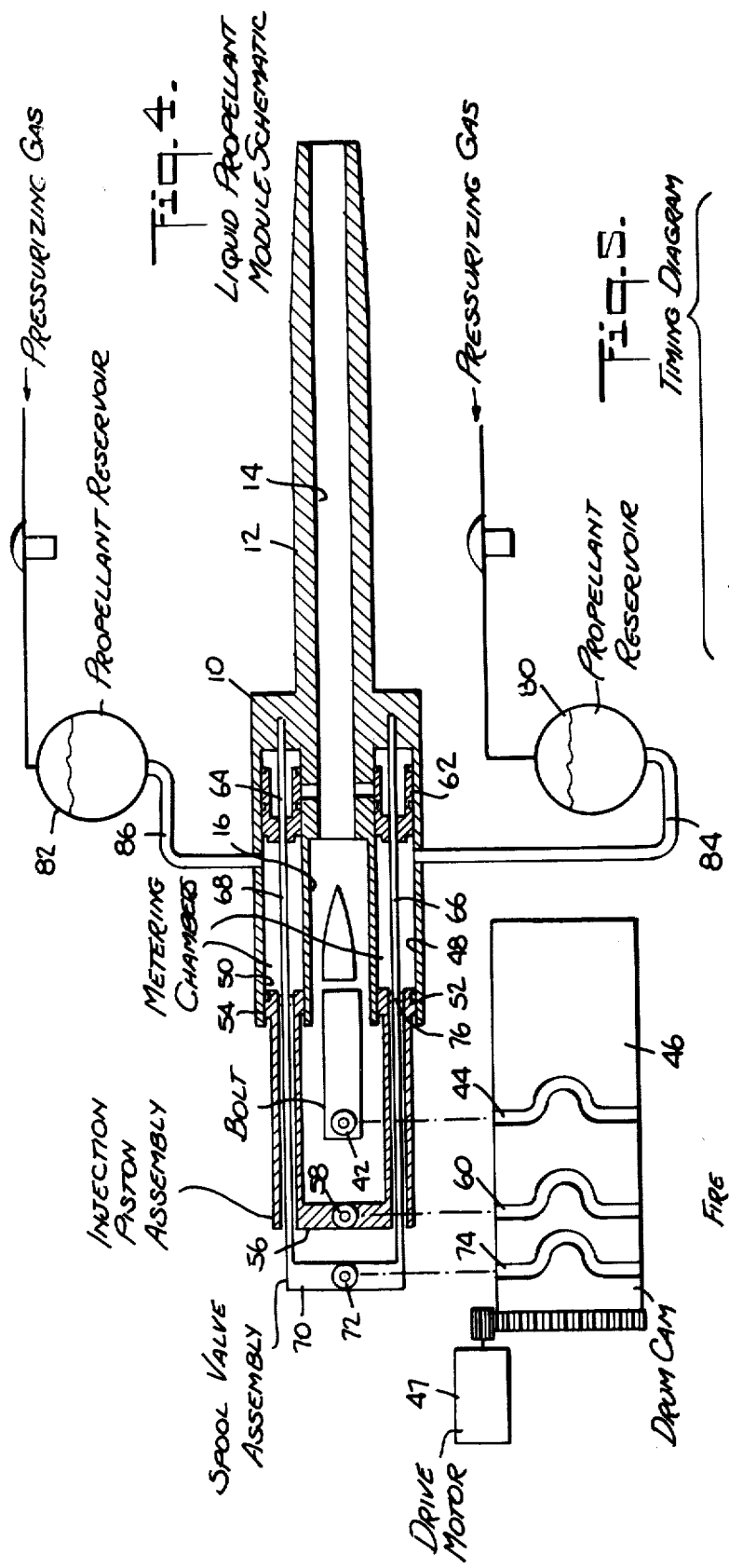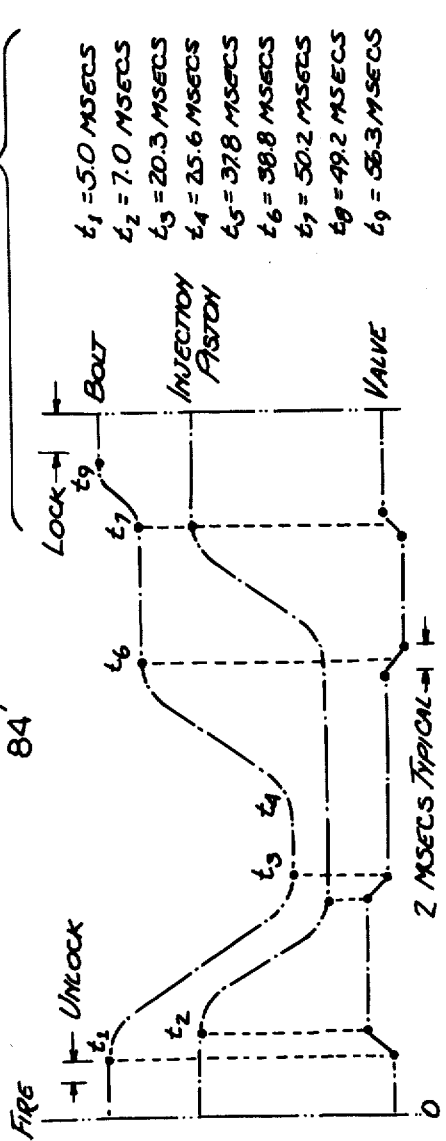

HIGH RATE OF FLOW PORT FOR SPOOL VALVES

The invention herein described was made in the course of or under a contract or subcontract thereunder with the Department of the Navy.

RELATED PATENT

This application is a division of U.S. Patent application Ser. No. 148,833, filed June 1, 1971, now U.S. Pat. No. 3,763,739, issued Oct. 9, 1973.

BACKGROUND OF THE INVENTION

1. Field of the Invention

This invention relates to high rate of flow, rapid actuation valves, such as spool valves, and is particularly adapted for high rate of fire, liquid propellant guns.

2. Prior Art

Low rate of fire, liquid propellant or initiant guns are disclosed in U.S. Pat. No. 3,455,202 issued July 15, 1969 to Dixon et al, utilizing a quasi-spool valve; and U.S. Pat. No. 3,537,352 issued Nov. 3, 1970 to R. W. Joyce, utilizing a ball valve.

SUMMARY OF THE INVENTION

To achieve a high rate of fire in a liquid propellant gun, the propellant must be injected into the combustion chamber in a short interval of time. This requires high rate of flow of the propellant through the valve controlling the combustion chamber, and a rapid on/off actuation of the valve. A high rate of flow, at a given pressure, requires a large cross-section of conduit. Spool valves are conventionally utilized to provide rapid actuation. An efficient form of the conventional spool valve utilizes O-ring seals. O-ring seals are rapidly damaged when they are passed over an opening which is larger than the longitudinal dimension, i.e., width, of the seal.

Accordingly, it is an object of this invention to provide a spool valve with a port which provides adequate support for the seal while permitting a high rate of flow.

An additional object of this invention is to provide a spool valve with a port which controls the rise and fall characteristics of the pulse envelope of the fluid flow.

A feature of this invention is a spool valve having a spool with an O-ring seal, said seal having a given longitudinal dimension, the spool operating in a bore in a housing to open and close a port opening into said bore, said port formed of a plurality of apertures, each aperture having a diameter, parallel to the longitudinal axis of said O-ring, which is smaller than said given longitudinal dimension of said seal.

BRIEF DESCRIPTION OF THE DRAWING

These and other objects, advantages and features of the invention will be apparent from the following specification thereof taken in conjunction with the accompanying drawings in which:

FIG. 1 is a partial view, in cross-section, taken on a longitudinal plane, through a liquid propellant gun incorporating a spool valve embodying this invention;

FIG. 2 is a transverse view, in partial cross-section, taken along the plane II—II of FIG. 1;

FIG. 3 is a detail view, in cross-section, taken along the plane III—III of FIG. 2;

FIG. 4 is a schematic of the gun of FIG. 1; and

FIG. 5 is a timing diagram of the operation of the gun of FIG. 4.

DESCRIPTION OF THE PREFERRED EMBODIMENT

The gun includes a receiver 10, in which is fixed a barrel 12 having a bore 14. The aft end of the bore is chambered at 16 to receive a projectile 18 having an O-ring seal 20 and a rifling band 22, and to provide a combustion chamber 24. The receiver includes a bolt body 30 having a bolt head 32 having a central bore in which an electrode 34 is fixed in a dielectric sleeve 36. An L-seal 38 is provided at the extreme forward end as a high pressure firing seal, and an O-ring 40 is provided aft of the L-seal as a low-pressure back up seal against fluid leakage during propellant injection. The bolt has a transversely projecting roller 42 which rides in a cam slot 44 in a cam 46, driven by a motor 47.

The receiver includes two additional longitudinal bores 48 and 50 in which two pistons 52 and 54 respectively slide. The two pistons are coupled aft by a yoke 56 which has a transversely projecting roller 58 which rides in a cam slot 60 in the cam 46.

Two spools 62 and 64 respectively slide in the forward portions of the bores 48 and 50. The spools are respectively fixed to rods 66 and 68 which are coupled aft by a yoke 70 which has a transversely projecting roller 72 which rides in a cam slot 74 in the cam 46. Each rod is journalled through a bore 76 in the piston and a bore 78 in the receiver. Each spool has a forward O-ring seal 79A and an aft O-ring seal 79B.

Two propellant reservoirs 80, 82 are pressurized by suitable supplies of gas and are respectively coupled by conduits 84, 86 to the bores 48, 50.

Two ports 88, 90 are provided respectively between the bore 48 and the combustion chamber 24 and the bore 50 and the combustion chamber. Each port consists of a plurality of bores 92, each bore having a diameter which is smaller than the longitudinal width of the O-ring seal 79A, 79B. Thus the annulus around each bore supports the seal as the seal moves over the bore. The total cross-sectional area of each port 88, 90 is equal to the sum of the cross-sectional areas of the component bores 92. The pattern of bores may be arranged to provide either a steep or shallow a rise and fall of the fluid pulse envelope as is desired. For example, if it is desired to have as steep a rise as possible, the number of bores in the first rows of bores which are uncovered by the spool is made as large as possible as shown enclosed by the dotted lines A in FIG. 3; but if it is desired to have a shallow fall, the number of bores in the last rows of bores which are covered by the spool is progressively made smaller, as shown enclosed by the dashed lines B in FIG. 3.

The timing of the gun is illustrated in FIG. 5.

It is contemplated that the inventive concepts hereinabove described may be variously otherwise embodied and combined without departing from the inventive principles involved and intended to be covered by the appended claims, except insofar as limited by the prior art.

What is claimed is:

1. A valve for controlling the passage of fluid therethrough, for providing a steep rise to the fluid pulse envelope, comprising:

a valve chamber having a surface which has therein a port means for fluid, a valve spool having a longitudinal axis and having a ring type seal abutting said surface for closing and for exposing said port means, said valve spool being disposed for rectilinear movement along its longitudinal axis, said ring type seal having a cross-sectional diameter parallel to said axis, said port means comprising a plurality of bores, each having a respective and identical diameter parallel to said spool longitudinal axis which is smaller than said cross-section diameter of said ring type seal, the total cross-sectional area of said port means being equal to the sum of the cross-sectional areas of said bores, said plurality of bores being arranged in a pattern of rows transverse to said spool longitudinal axis, the number of said bores in each of said rows being a variable to predetermine the steepness of the rise of the fluid pulse envelope generated by operation of said valve, and arranged in a pattern of acceleration of cross-sectional port area such that as said valve spool moves at a constant velocity to open said port, an increasing cross-sectional port area is exposed per unit time.

2. A valve for controlling the passage of fluid therethrough, for providing a steep rise to the fluid pulse envelope, comprising:

a valve chamber having a surface which has therein a port means for fluid, a valve spool having a longitudinal axis and having a ring type seal abutting said surface for closing and for exposing said port means, said valve spool being disposed for rectilinear movement along its longitudinal axis, said ring type seal having a cross-sectional diameter parallel to said axis, said port means comprising a plurality of bores, each having a respective and identical diameter parallel to said spool longitudinal axis which is smaller than said cross-section diameter of said ring type seal, the total cross-sectional area of said port means being equal to the sum of the cross-sectional areas of said bores, said plurality of bores being arranged in a pattern of rows transverse to said spool longitudinal axis, the number of said bores in each of said rows being a variable to predetermine the steepness of the rise of the fluid pulse envelope generated by operation of said valve, and the number of bores in the rows of bores which are initially uncovered by the spool is made relatively large compared to the number of bores in the rows of bores which are subsequently uncovered so that as said valve spool moves at a constant velocity to open said port, an decreasing cross-sectional port area is exposed per unit time.

3. A valve for controlling the passage of fluid therethrough, for providing a shallow fall to the fluid pulse envelope, comprising:

a valve chamber having a surface which has therein a port means for fluid, a valve spool having a longitudinal axis and having a ring type seal abutting said surface for closing and for exposing said port means, said valve spool being disposed for rectilinear movement along its longitudinal axis, said ring type seal having a cross-sectional diameter parallel to said axis, said port means comprising a plurality of bores, each having a respective and identical diameter parallel to said spool longitudinal axis which is smaller than said cross-section diameter of said ring type seal, the total cross-sectional area of said port means being equal to the sum of the cross-sectional areas of said bores, said plurality of bores being arranged in a pattern of rows transverse to said spool longitudinal axis, the number of said bores in each of said rows being a variable to predetermine the steepness of the fall of the fluid pulse envelope generated by operation of said valve, and arranged in a pattern of deceleration of cross-sectional port area such that as said spool valve moves at a constant velocity to close said port, a decreasing cross-sectional port area is closed per unit time.

4. A valve for controlling the passage of fluid therethrough, for providing a shallow fall to the fluid pulse envelope, comprising:

a valve chamber having a surface which has therein a port means for fluid, a valve spool having a longitudinal axis and having a ring type seal abutting said surface for closing and for exposing said port means, said valve spool being disposed for rectilinear movement along its longitudinal axis, said ring type seal having a cross-sectional diameter parallel to said axis, said port means comprising a plurality of bores, each having a respective and identical diameter parallel to said spool longitudinal axis which is smaller than said cross-section diameter of said ring type seal, the total cross-sectional area of said port means being equal to the sum of the cross-sectional areas of said bores, said plurality of bores being arranged in a pattern of rows transverse to said spool longitudinal axis, the number of said bores in each of said rows being a variable to predetermine the steepness of the rise or fall of the fluid pulse envelope generated by the operation of said valve, and the number of bores in the rows of bores which are finally covered by the spool is made progressively smaller compared to the number of bores in the rows of bores which are initially covered to that as said valve spool moves at a constant velocity to close said port, a decreasing cross-sectional port area is closed per unit time.

* * * * *